United States Patent [19]

Roberts

[11] Patent Number: 5,138,804
[45] Date of Patent: * Aug. 18, 1992

[54] STRUCTURAL GLASS UNIT

[75] Inventor: David R. Roberts, St. Helens, England

[73] Assignee: Pilkington plc., St. Helens, England

[*] Notice: The portion of the term of this patent subsequent to Jul. 2, 2008 has been disclaimed.

[21] Appl. No.: 723,239

[22] Filed: Jun. 28, 1991

Related U.S. Application Data

[60] Division of Ser. No. 148,180, Jan. 27, 1988, Pat. No. 5,027,567, which is a continuation of Ser. No. 888,469, Jul. 23, 1986, abandoned.

[30] Foreign Application Priority Data

Jul. 31, 1985 [GB] United Kingdom ............ 85/19276

[51] Int. Cl.$^5$ ................................. E04B 7/00
[52] U.S. Cl. ......................... 52/51; 52/57; 52/398; 52/248
[58] Field of Search ............ 52/51, 398, 248, 57, 52/397, 208, 202, 18, 90, 285, 203, 573

[56] References Cited

U.S. PATENT DOCUMENTS

| | | |
|---|---|---|
| 684,438 | 10/1901 | King . |
| 771,535 | 10/1904 | Coffin . |
| 2,356,878 | 8/1944 | Painter . |
| 2,398,886 | 4/1946 | Drake et al. . |
| 2,716,783 | 9/1955 | Fegan . |
| 2,758,042 | 8/1956 | Raymond et al. . |
| 2,887,740 | 5/1959 | Potchen . |
| 3,150,463 | 9/1964 | Nearing et al. . |
| 3,382,630 | 5/1968 | Chivers . |
| 4,006,565 | 2/1977 | Thompson et al. . |
| 4,406,105 | 9/1983 | Colvin . |
| 4,462,390 | 7/1984 | Holdridge et al. . |
| 4,581,868 | 4/1986 | McCann . |
| 5,027,567 | 7/1991 | Roberts ................... 52/57 |

FOREIGN PATENT DOCUMENTS

| | | |
|---|---|---|
| 842657 | 7/1960 | United Kingdom . |
| 1060031 | 2/1967 | United Kingdom . |
| 1181517 | 2/1970 | United Kingdom . |
| 1272774 | 5/1972 | United Kingdom . |
| 1495580 | 12/1977 | United Kingdom . |
| 2096682 | 10/1982 | United Kingdom . |
| 2148372 | 5/1985 | United Kingdom . |

OTHER PUBLICATIONS

Article: "Sweet's Catalog File, Products for General Building and Renovation" McGraw-Hill, N.Y., 1985 (2 pages).

Primary Examiner—David A. Scherbel
Assistant Examiner—Wynn E. Wood
Attorney, Agent, or Firm—Burns, Doane, Swecker & Mathis

[57] ABSTRACT

A structural glass unit comprises a multi-ply glass assembly, for example a glass laminate or a sealed double glazing unit, which may be part of a roof structure. The glass assembly has a stepped configuration at a location where the assembly is secured to a supporting member, by a clamp which is clamped to one glass sheet only of the glass assemby.

3 Claims, 5 Drawing Sheets

STRUCTURAL GLASS UNIT

This application is a divisional of U.S. Ser. No. 07/148,180, filed Jan. 27, 1988 now U.S. Pat. No. 3,702,567 which, in turn, is a continuation of U.S. Ser. No. 06/888,469, filed Jul. 23, 1986, now abandoned.

BACKGROUND OF THE INVENTION

This invention relates to structural glass units and in particular to structural glass units comprising a multiply glass assembly, such as a glass laminate or double glazing unit, which is used in a situation, for example as part of a roof structure, where it is desirable to secure the structural glass unit against a bending moment.

It is known to secure a glass laminate to a supporting structure by means of bolts which extend through aligned holes in the glass sheets of the laminate and the plastics interlayer material. GB 1 272 774 describes such a laminated structure for use as an aircraft window. There is also in U.S. Pat. No. 4,204,374 a description of an aircraft windshield which is bolted to the air frame structure.

GB 2,148,372 A describes a glass assembly comprising a planar array of sealed multiple glazing units which are secured to supporting members by mechanical fixings which pass through the outer sheets of the units outside the seals of those units. The outer sheets are sealed edge-to-edge.

When using laminated glass units in architectural structures it has been found that if the edge of a laminate is gripped sufficiently tightly to support the edge of the laminate against a bending moment, the pressure on the interlayer of plastics material causes the interlayer to exude from the laminate. It has also been found that if the edge of a sealed multiple glazing unit is gripped too tightly the pressure may cause deformation of the spacer strip, usually an aluminium spacer and of the sealant which is used to seal the spacer strip between the panes of the glazing unit.

This invention is based on the discovery that this problem can be overcome and a more secure load bearing connection can be achieved by securing the multiply glass assembly by connection to one glass sheet only of the assembly.

SUMMARY OF THE INVENTION

According to the invention there is provided a structural glass unit comprising a glass assembly having a stepped configuration at a location where the glass assembly is secured to a supporting member by a clamp which is clamped to one glass sheet only of the glass assembly.

Preferably the glass assembly has a stepped configuration along one edge and is secured to the supporting member by camps at least at two locations along that edge.

The glass assembly may be inclined at an angle of at least 15° to the vertical and supported principally in the region of opposite horizontal margins, the glass assembly having a stepped configuration at a location on one of said margins where it is secured to a supporting membet by a clamp which is clamped to one glass sheet only of the assembly so that said margin is not free to flex and the glass assembly is subject to a bending moment about that margin.

In one embodiment for architectural use the glass assembly is a glass laminate. The glass laminate may comprise two glass sheets laminated together by a plastics interlayer, one of the sheets being a toughened glass sheet which is larger than the other sheet, thereby forming the stepped configuration.

Preferably both sheets of glass are toughened. Said one glass sheet may be formed with at least one hole for attachment of a clamp.

In another embodiment, also for architectural use, the glass assembly may be a sealed double glazing unit.

Preferably the inner pane of the double glazing unit is inset from the outer panel to form a stepped configuration, and a clamp for securing to a supporting member is clamped to the outer panel outside the seal of the double glazing unit.

The inner pane may be inset from the outer pane at least at two locations along the lower margin of the double glazing unit, forming flanges at those locations with fixing holes in those flanges outside the seal of the double glazing unit for attachment of clamps for securing the double glazing unit to a supporting member.

The invention also comprehends a glass roof structure comprising a number of the structural glass units of the invention, which units are inclined and are positiond edge-to-edge with the bottom of each unit secured to a supporting member for the roof.

The bottom edge of the clamped glass sheet of each glass assembly may overlie a gutter of the roof.

Two series of structural glass units of the invention may co-operate to form a ridge roof, with the glass assemblies of each series positioned edge-to-edge, the bottom of each glass assembly secured to a supporting member for the roof, and the tops of facing glass assemblies connected just below the roof apex by knuckle joints whose components are secured to the facing glass assemblies.

In a preferred ridge roof structure the abutting edges of the glass assemblies of each series are spanned ner their tops by the knuckle joints.

In a glass roof structure in which two series of structural glass units of the invention co-operate to form a ridge roof, with each structural glass unit including a double glazin unit, the double glazing units of each series may be positioned edge-to-edge, the bottom of the inner pane of each double glazing unit secured to a supporting member for the roof, and the tops of the facing double glazing units connected just below the roof apex by knuckle joints whose components are secured to the facing double glazing units by fixing assemblies attached to the outer panes of the double glazing units without impairing the seals of those units.

Prefrably in this roof structure of double glazing units each fixing assembly passes through a sealed hole in the inner pane of a double glazing unit, within the perimeter seal of the double glazing unit, with a clearance sufficient to facilitate the flexing of the double glazing unit under wind load, and that fixing assembly passes through a hole in the outer pane of the unit and is clamped to that outer pane only.

Each fixing assembly may include a boss positioned between and sealed to both panes of the double glazing unit.

In a preferred ridge roof structure with double glazing units, the abutting edges of the double glazing units of each series are spanned near their tops by the knuckle joints.

BRIEF DESCRIPTION OF THE DRAWINGS

Some embodiments of the invention will now be described, by way of example, with reference to the accompanying drawings in which.

DETAILED DESCRIPTION

Figure 1:
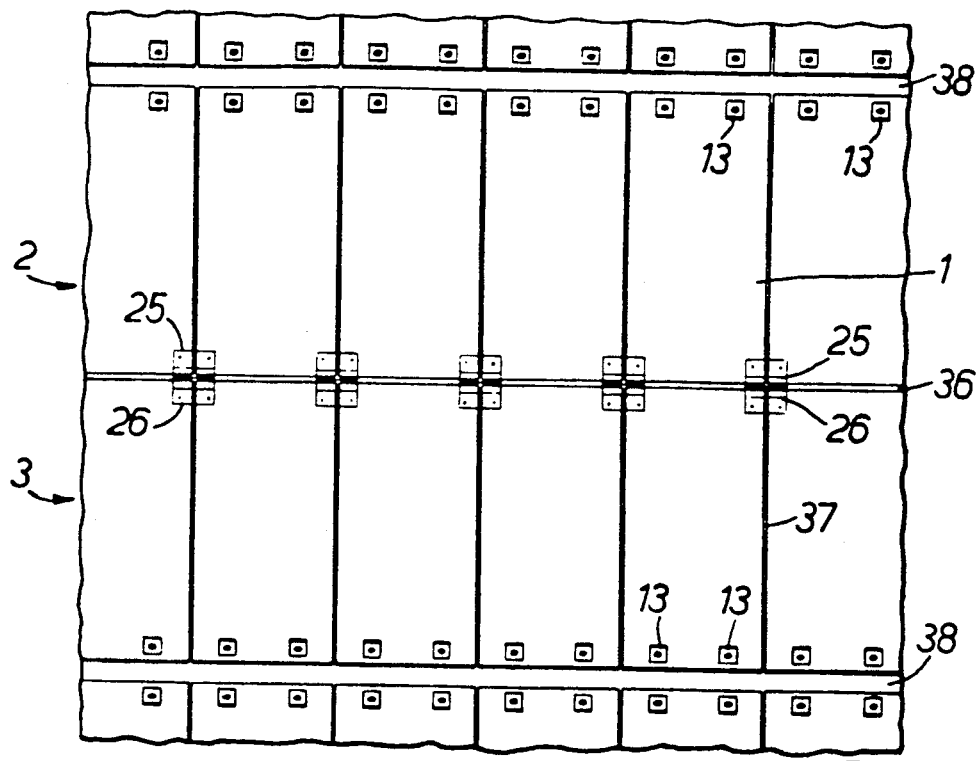
FIG. 1 is a top plan view of part of a ridge roof structure according to the invention made up of structural glass units of the invention.

Referring to the drawings a ridge roof structure comprises a number of structural glass units 1. These glass units are arranged as two series indicated generally at 2 and 3. The structural glass units of each series are inclined and cooperate to form the ridge roof. Each structural glass unit 1 comprises a multi-ply glass assembly, in this embodiment a glass laminate 4, FIGS. 2 and 3, preferably consisting of sheets of toughened glass.

Figure 2:
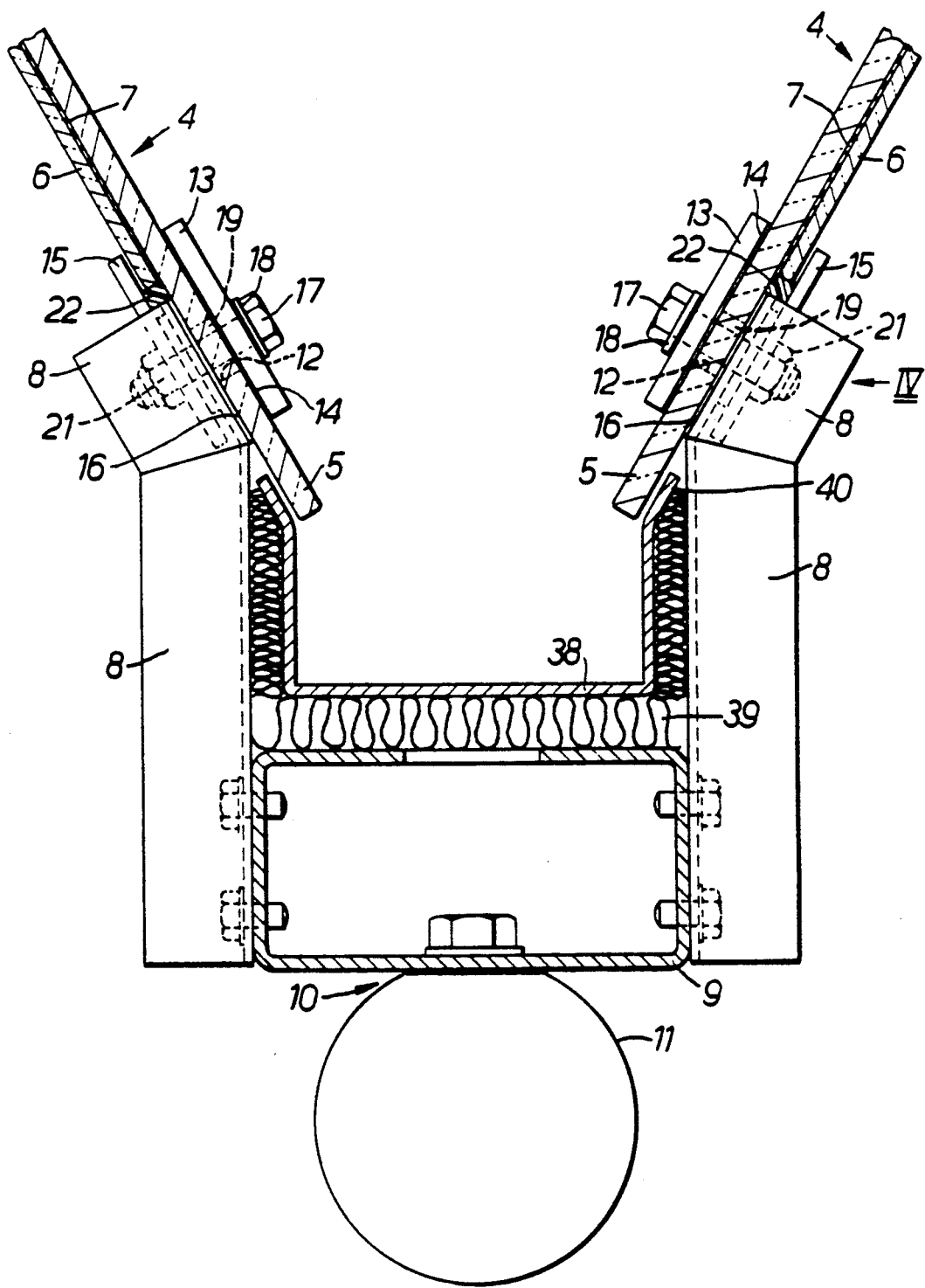
FIG. 2 is a cross-section through a trough of the ridge roof structure of FIG. 1.

In the illustrated embodiment, the glass laminate 4 consists of an outer sheet of toughened lass 5 which is 12mm thick and an inner sheet of toughened glass 6 which is 6mm thick. These glass sheets are bonded together by a plastics interlayer 7 for example of polyvinylbutyral. The bottom of each laminate is secured to a supporting member 8 which is a glass fixing bracket, which is itself bolted to a roof member 9 which is bolted at 10 to a node point of a basic structural framework 11. There is a glass fixing bracket 8 bolted to each side of the roof member 9. The outer glass sheet 5 of each unit is larger than the inner glass sheet 6 of that unit so that the laminate has a stepped configuration along its lower edge where the structural glass unit is to be secured to glass fixing brackets 8. As shown in FIG. 2 two of the brackets 8 are clamped to the outer glass sheet 5 by means of clamps which are attached to spaced holes 12 near the bottom edge of the outer sheet 5. The clamps clamp the bottom margin of the sheet 5 and restrain it from flexing under the weight of the sheet.

The drilling of all necessary holes in the glass sheets 5 of the laminate is carried out before the sheets are toughened and laminated.

Figure 4:
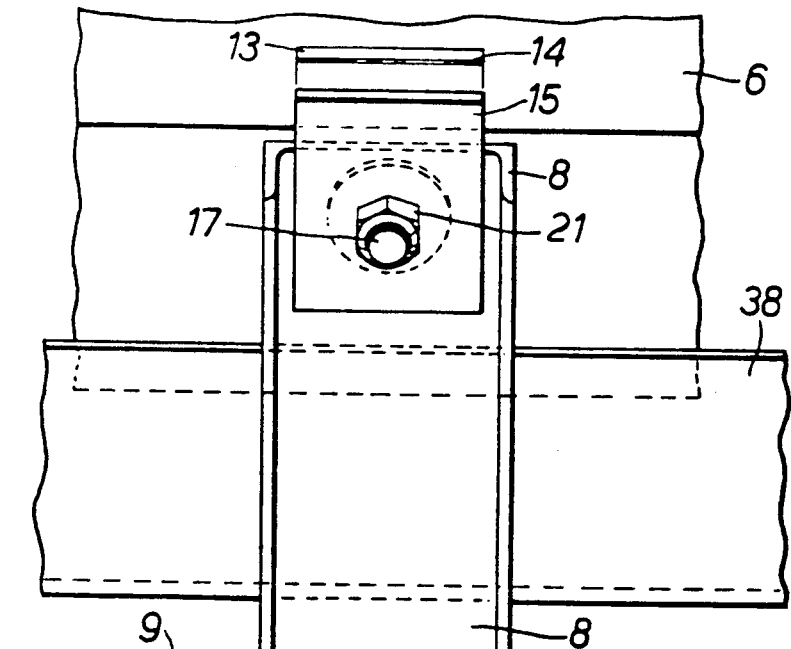
FIG. 4 is an elevation in the direction of arrow IV in FIG. 2 showing a clamping assembly at the bottom of one laminate of the roof.
Figure 4:
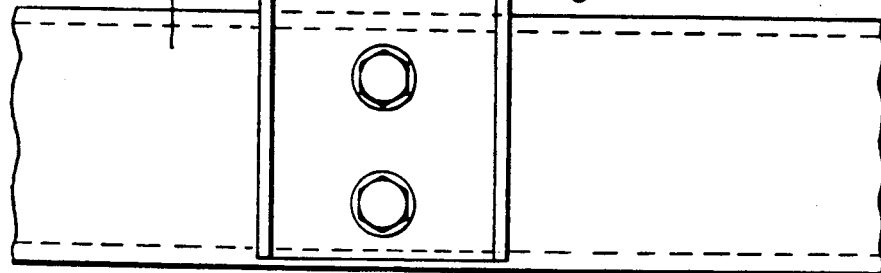

FIGS. 2 and 4 show how the outer glass sheet only is clamped by clamps each of which is fixed to the upper end of a bracket 8. Each clamp comprises an outer clamp plate 13 which bears, through a gasket 14, on the outer face of the outer glass sheet 5 and an inner clamp plate 15 which bears on the outer face of the upper end of the bracket 8. A gasket 16 is located between the bracket 8 and the inner face of the sheet 5. A clamping bolt 17, prefrably of high tensile steel, passes from the outside through the clamp plate 13. Steel washers 18 are located between the head of the bolt 17 and the clamp plate 13 and between the bracket 8 and the clamp plate 15, and the bolt passes through a bush 19 located in the hole 12 in the glass sheet 5. A nut 21 is tightened on to the end of the bolt 17 to a predetermined torque which will depend on the design load of the roof and the dimensions of the units, and bears against the clamp plate 15, which extends upwardly to lap the lower edge of the inner glass sheet 6. The lower edge of the inner sheet 6 is located on the upper edge of the bracket 8 using setting blocks 22.

Figure 3:
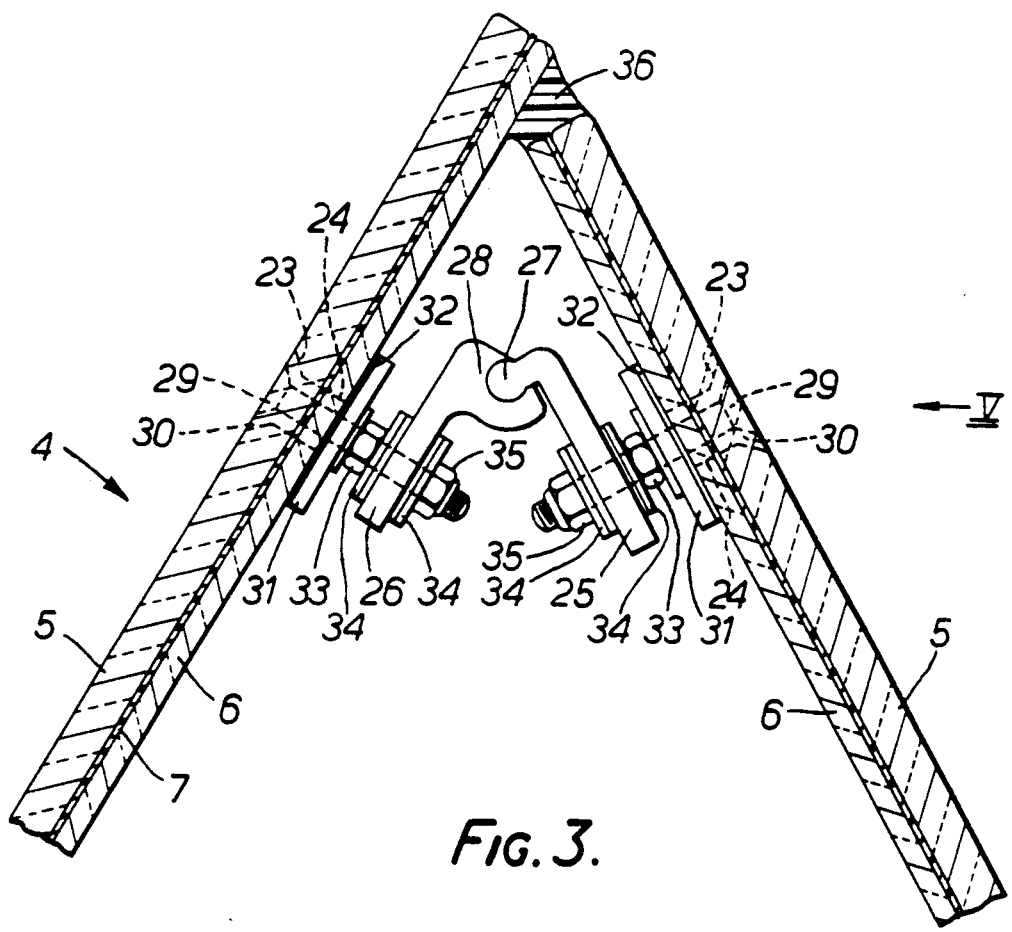
FIG. 3 is a cross-section through a ridge of the ridge roof structure of FIG. 1.
Figure 5:
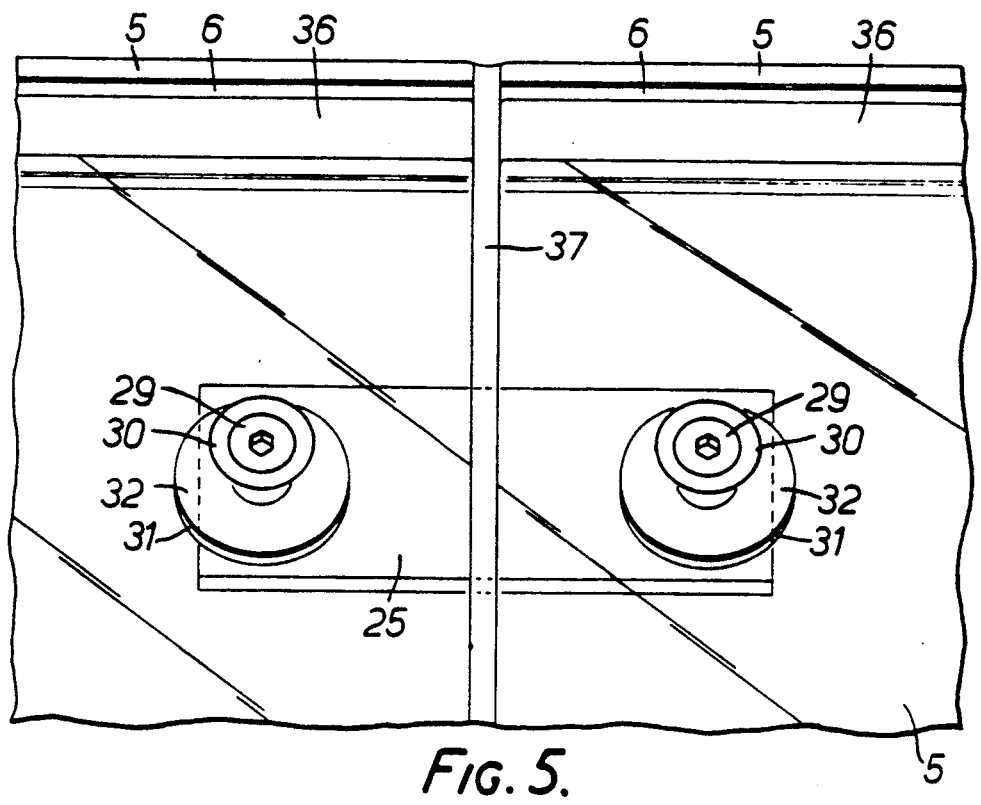
FIG. 5 is a view in the direction of arrow V of FIG. 3 showing a knuckle joint spanning the abutting edges of two laminates of the roof.

Near the top corners of each laminate there are aligned holes 23 and 24 in the outer and inner glass sheets 5 and 6. The holes 23 in the outer sheets 5 are countersunk as illustrated in FIG. 3. FIG. 5 shows how the abutting edges of the inner sheets 6 of two adjacent laminates of each series are spanned near their tops by a knuckle joint comprising two joint plates 25 and 26. A head 27 extending along the upper edge of joint plate 25 interlocks into a socket 28 extending along the upper edge of joint plate 26. Each of the joint plates is fixed to each of the abutting laminates and each fixing comprises a bolt 29 whose head fits flush into a bush 30 in one of the countersunk holes 3, 24 in the outer glass sheet 5. Each bolt 29 passes through a steel clamping disc 31 which bears on the inner face of the inner glass sheet 6 through a gasket 32. The disc 31 is clamped against the glass sheet by a nut 33. The appropriate joint plate 25 or 26 is secured on the bolt 29, between steel washers 34, by a nut 35. The laminate at the right-hand side of the ridge as shown in FIG. 3 is slightly shortened so that the upper edge of the laminate at the left-hand side rises above it to form the actual apex of the roof. The space between the upper edges of the facing laminates is filled with translucent silicone sealant 36. Similar sealant also fills the spaces between the edges of adjacent laminates of each series as indicated at 37.

FIG. 2 shows a gutter 38 which is supported by a spacer 39 on the roof member 9. The bottom edge of the clamped sheet 5 of each inclined laminate overlies the gutter. The upper edges 40 of the gutter slope outwardly to accommodate the bottom edges of the sheets 5.

With this construction two secure load bearing connections are made to the bottom margin of each structural glass unit, each connection clamping the bottom margin so that it is not free to flex, and supporting the unit against the bending moment, resulting from the weight of the unit, about the margin. The knuckle-joint interconnection of facing pairs of abutting laminates below the apex of the roof ensures that the roof can flex as the wind loading changes, while the roof has sufficient stiffness over its whole span.

The ridge roof construction may be a single ridge, or a ridge roof consisting of a number of parallel ridges and covering a large floor area, for example a factory building.

Figure 6:
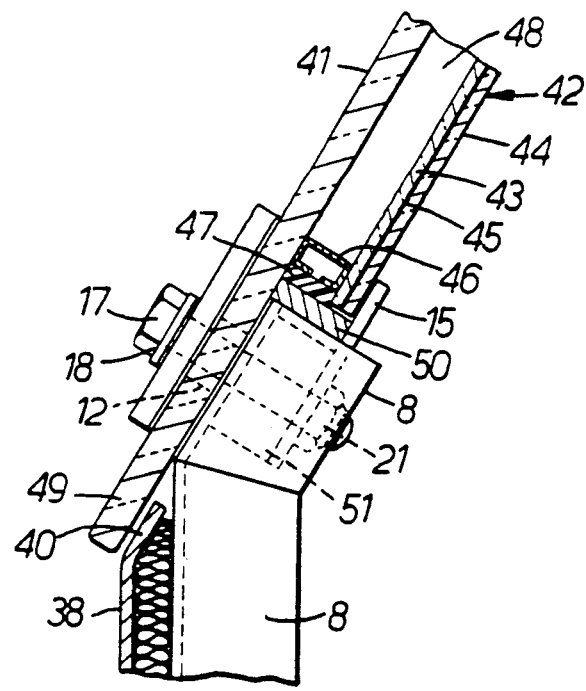
FIG. 6 is a view similar to part of FIG. 2 showing the clamping of the lower margin of a sealed double glazing unit in a ridge roof structure

FIG. 6 illustrates a modification of the ridge roof structure of FIG. 2, in which each glass assembly is a sealed double glazing unit comprising an outer panel 41 of toughened glass which is 10mm or 12mm thick. The inner pane, indicated generally at 42, is a glass laminate comprising two sheets 43 and 44 of annealed or toughened glass. Each of the sheets 43, 44 is 3mm thick and the sheets are laminated together with an interlayer 45 of polyvinylbutyral which is 0.4mm thick. The two panes 41 and 42 are spaced apart by an aluminium spacer 46 of conventional cross-sectional and are secured to the spacer by a silicone sealant 47. The sealed interspace 48 between the panes 41 and 42 is, in this embodiment, 16mm wide.

The lower edge of the inner pane 42 is inset from the outer pane 41 to form a stepped configuration along the lower margin of the double glazing unit as illustrated in FIG. 6. Alternatively the stepped configuration instead of extending the full width of the unit may be provided locally at each lower corner of the double glazing unit or at other spaced locations along the lower margin of the double glazing unit. The spacer 46 is shaped to conform to the outline of the inner pane and follows the shape of the lower edge of the inner pane. A peripheral seal is thus maintained around the double gazing unit.

The outer panel 41 therefore provides a flange or flanges 49 extending beyond the inner pane. Before toughening two holes 12 are drilled in the flange or flanges 49 at spaced locations along the lower edge of the outer pane.

In the same way as illustrated in FIG. 2 the flange(s) 49 of the inner pane are secured to supporting brackets 8 by means of clamps so that the bottom margin of the double glazing unit is clamped to restrain it from flexing under the weight of the double glazing unit. First of all each double glazing unit is located on the brackets 8 using setting blocks 50 for seating the step of the double glazing unit onto the supporting brackets 8. Each flange 49 is then clamped to its bracket 8 using a clamp similar to that described with reference to FIG. 2, but including a metal spacer 51 between the gasket 16 and the inner clamp plate 15. The lower margin of the double glazing unit is thus secured to he roof structure at locations outside the seal of the double glazing unit.

Figure 7:
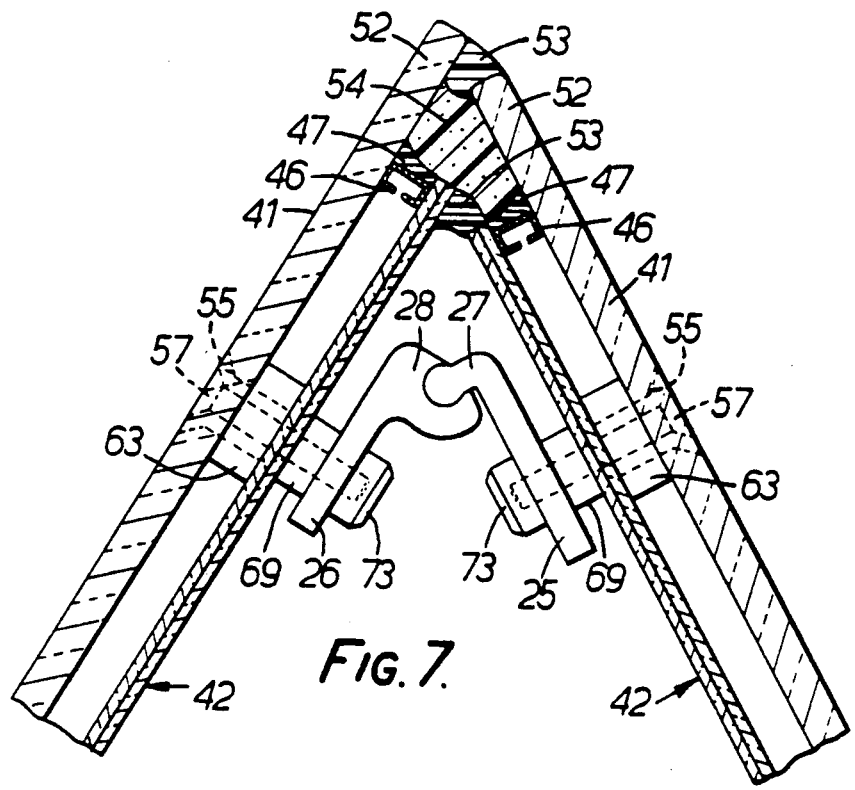
FIG. 7 is a cross-section similar to FIG. 3 through a ridge of a ridge roof structure employing sealed double glazing units.
Figure 8:
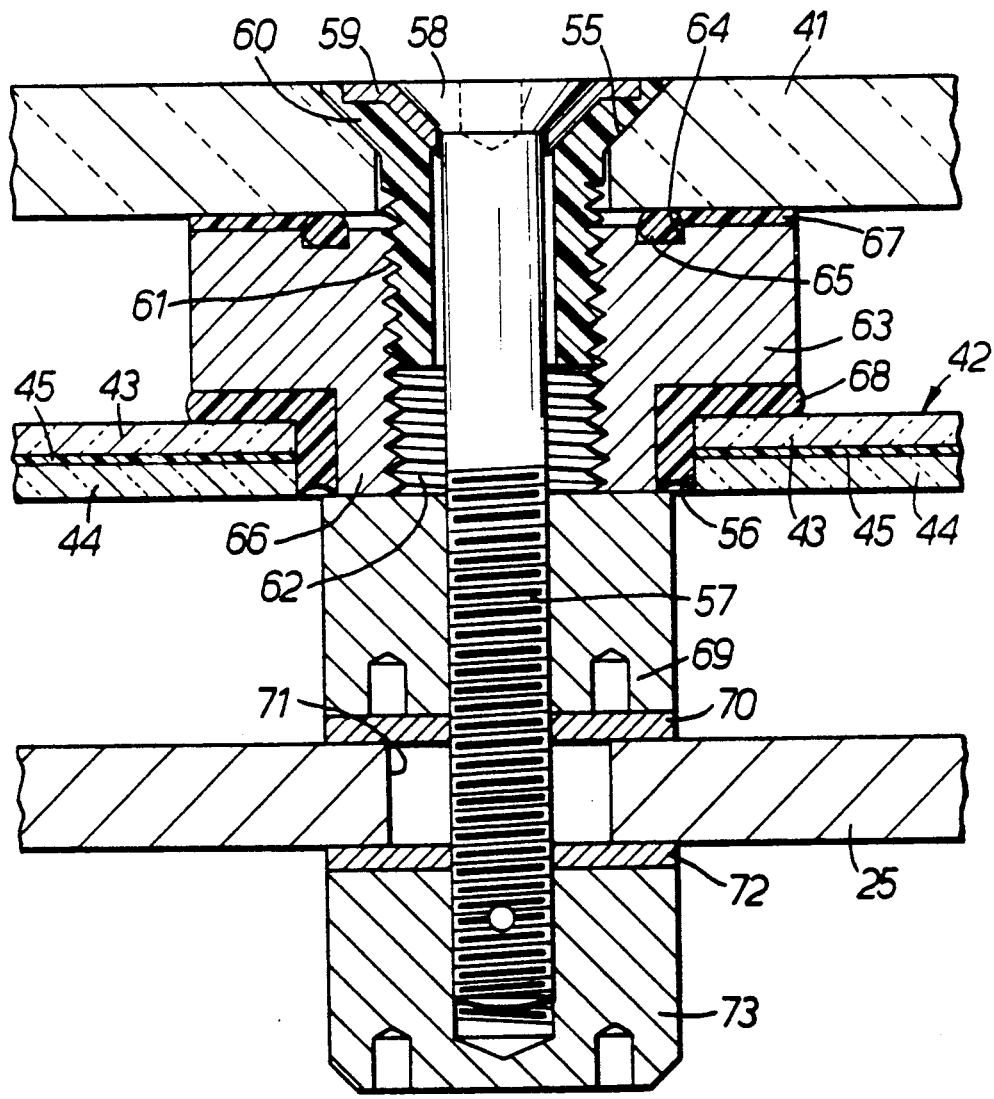
FIG. 8 is a detailed view of a fixing assembly employed in the ridge roof construction of FIG. 7.

In the same way as with the laminated glass assemblies of FIGS. 1 to 5, the double glazing units are positioned edge-to-edge and the tops of the facing double glazing units the ridge of the roof are connected just below the roof apex by knuckle joints whose components are secured to the facing double glazing units as illustrated in FIG. 7. The knuckle joints 27, 28 are secured to the facing double glazing units by fixing assemblies attached to the outer panes 41 of the double glazing units without impairing the seals of those units. In the same way as illustrated in FIGS. 3 and 5 the abutting edges of the double glazing units of each series are spanned near their tops by the knuckle joints. Each double glazing unit is fixed to the knuckle joints at two locations which are spaced apart and along the upper edge of the double glazing unit, within the seal of the double glazing unit. Along the upper margin of each double glazing unit at the ridge of the roof the outer pane 41 extends beyond the inner pane 42 to form an upper flange 52. In the embodiment illustrated in FIG. 7 the double glazing unit to the left-hand of the drawing would have a slightly greater height dimension than the double glazing unit to the right of the ridge so that the upper edges of the outer panes 41 and the inner panes 42 can overlap at the rood ridge with appropriate spacing for the introduction of silicone sealant 53 between the upper edges of the flanges 52 at the top of the ridge and between the upper edges of the inner panes 42 at the apex of the inside of the ridge. The space between the upper flanges 52 of the outer panes is filled with a packing foam 54. Before the outer panes 41 of the double glazing units are toughened, holes are drilled in the panes for the clamping of the fixing assemblies. At each fixing position the outer pane 41 has been drilled with a countersunk hole 55, FIG. 8, and the laminated inner pane 42 has a hole 56 through which the fixing assembly passes with clearance. Each fixing assembly includes a fixing member in the form of a long stainless steel bolt 57 which passes right through the double glazing unit and is secured to one of the joint plates 25 or 26 of the knuckle joint. The head 58 of the bolt fits into a shaped stainless steel cup washer 59 which itself engages in a bush 60 which is made of a resilient material, for example Nylon (Trade Mark). The bush 60 has a tapered head which is a free fit in the countersunk hole 55 in the outer pane 41. The bush 60 carries the bolt 57 through the hole 55 and is a loose fit on the bolt 57. The outer surface of the bush 60 has a thread which engages with an internal thread, as indicated at 61, in a central aperture 62 which passes through a metal boss 63, for example of aluminium, which is positioned between and is sealed to both panes 41 and 42.

The boss 63 is of generally cylindrical form with an annular groove 64 in its outer face in which a sealing O-ring 65 for example of Nylon (Trade Mark) or silicone rubber of neoprene rubber is seated. The outside diameter of the metal boss 63 is slightly larger than the diameter of the hole 56 in the inner pane 42. During assembly of the double glazing unit the boss 63 is located on the outer panel 41 before the inner pane 42 is placed on the spacing frame 46.

The inner portion 66 of the boss 63 is of reduced diameter and is situated, with clearance, in the hole 56 in the inner pane. The inward part of the central aperture 62 through the boss 63 is of hexagonal internal shape and acts as a hexagonal socket for the insertion of a key which is used for tightening the boss 63 onto the thread of the bush 60. When assemblying these parts a flexible silicone sealing compound 67 is spread between the outer surface of the boss 63 and the inner surface of the outer pane 41, up to the sealing ring 65. The boss 63 is tightened onto the bush 60 so as to clamp the fixing assembly to the outer pane 41. The space between the boss 63 and the inner pane 42 is then filled with sealing compound 68 so that the fixing assembly passes through he double glazing unit without impairing the seal of the double glazing unit. The clearance between the inner part 66 of the boss and the hole 56 in the inner pane 42 is sufficient to facilitate the flexing of the unit under wind load for example. An aluminium spacer 69 is then threaded on to the bolt 57 and is tightened against the inner part 66 of the boss. A resilient gasket is then placed over the bolt and the protruding end of the bolt is passed through a wide hole 71 in the joint plate 25. A further resilient gasket 72 is placed over the end of the bolt and a self-locking nut 73 of stainless steel is tightened on to the end of the bolt to secure the fixing assembly to the knuckle joint plate 25. This mode of clamping each double glazing unit adjacent its upper margin to the joint plates ensures that when the double glazing units are subject to wind load the seals of the double glazing units are maintained due to the ability of the fixing assemblies to float in the holes 56 in the inner panes 42 without damaging the seal.

While some embodiments of this invention have been illustrated and described, it is understood that various modifications and changes will become obvious to those skilled in the art. Such modifications and changes may be made without departing from the true scope and spirit of this invention.

I claim:

1. An architectural structural glass unit comprising a glass assembly including at least two parallel glass sheets laminated together by a plastics interlayer, one of the sheets being a toughened glass sheet which is larger than the other sheet, thereby forming a stepped configuration the glass assembly being inclined at an angle of at least 15 degrees to the vertical and supported principally at opposite upper and lower horizontal margins, said stepped configuration disposed at said lower margin where the glass assembly is secured to a supporting member by clamps which are clamped to one glass sheet only of the glass assembly at separate locations along said lower margin so that said lower margin is not free to flex and the glass assembly is subject to a bending moment about said lower margin, said at least two glass sheets being connected to one another independently of said supporting members.

2. An architectural structural glass unit as claimed in claim 1, wherein said one glass sheet is formed with at least one hole for attachment of said clamp.

3. A glass roof structure including a number of structural glass units which are inclined and are positioned edge-to-edge, each said structural glass unit comprising a glass assembly including at least two parallel glass sheets laminated together, one of said sheets being larger than the other sheet to form a stepped configuration, said glass assembly being inclined at an angle of at least 15 degrees to the vertical and supported principally at opposite upper and lower horizontal margins, said stepped configuration disposed at said lower margin where the glass assembly is secured to a supporting member of the roof structure by clamps which are clamped to one glass sheet only of the glass assembly so that said lower margin is not free to flex and the glass assembly is subject to a bending moment about said lower margin, said at least two glass sheets being connected to one another independently of said supporting member.

* * * * *